April 15, 1924.
F. MUNAFO
MINIATURE PIANO.
Filed July 13, 1922    5 Sheets-Sheet 1
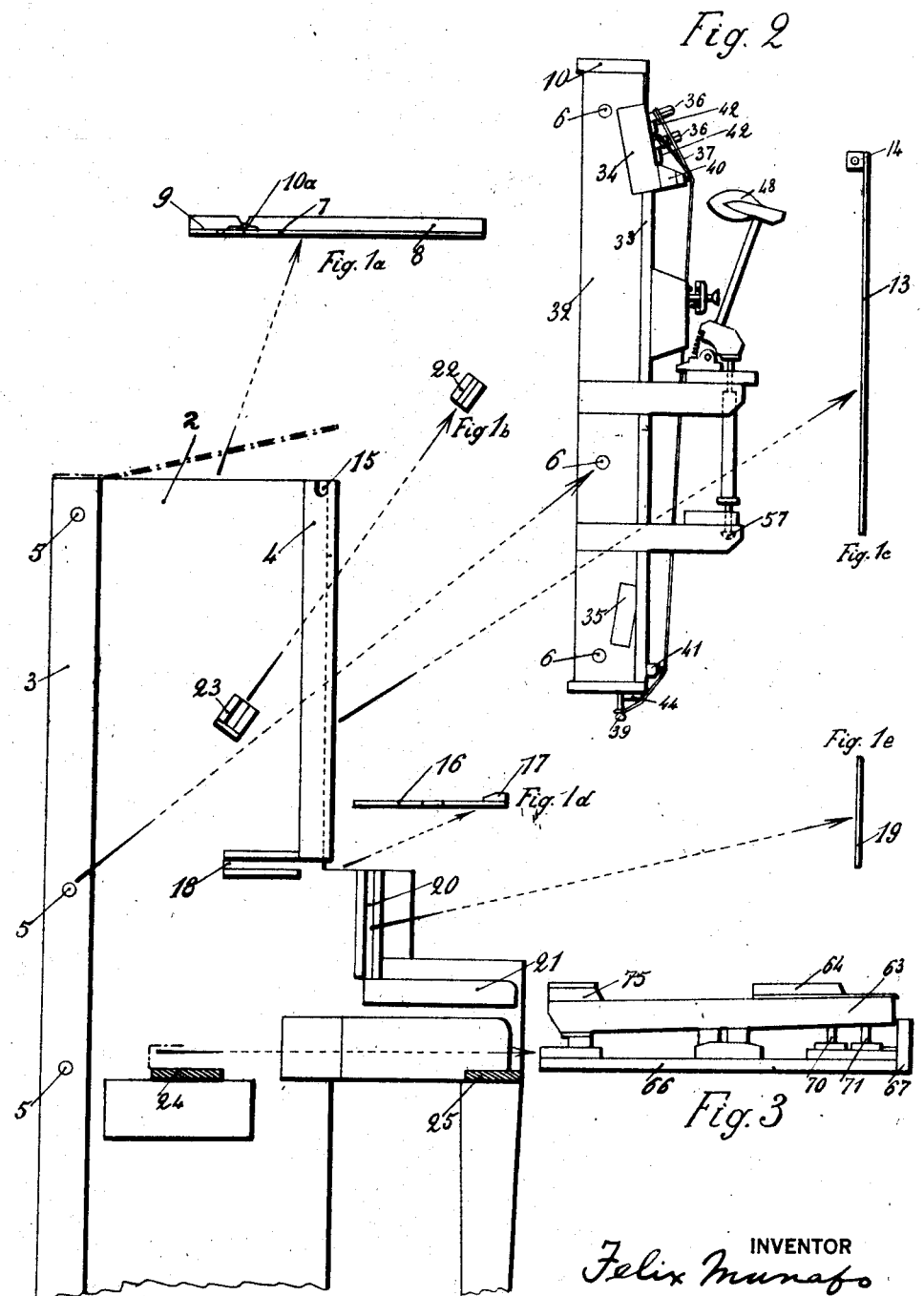
INVENTOR
Felix Munafo
BY
ATTORNEY April 15, 1924.
F. MUNAFO
MINIATURE PIANO
Filed July 13, 1922
1,490,678
5 Sheets-Sheet 2
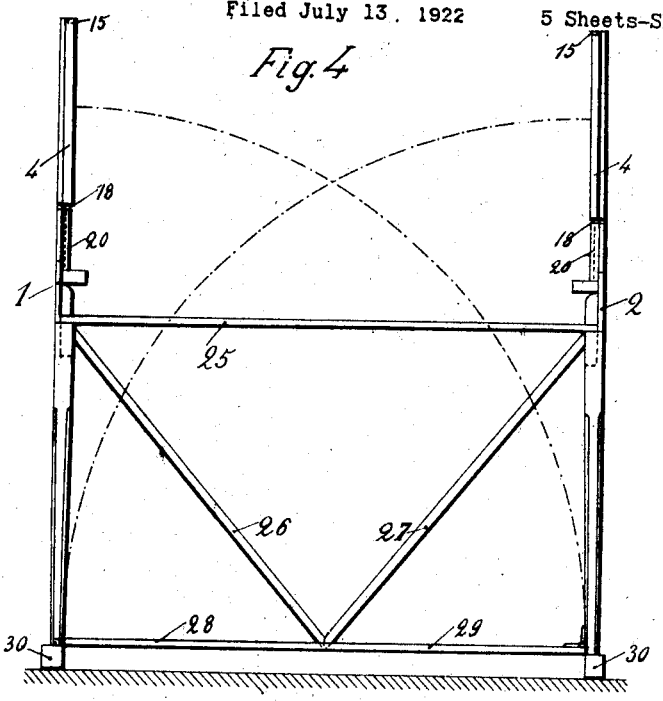
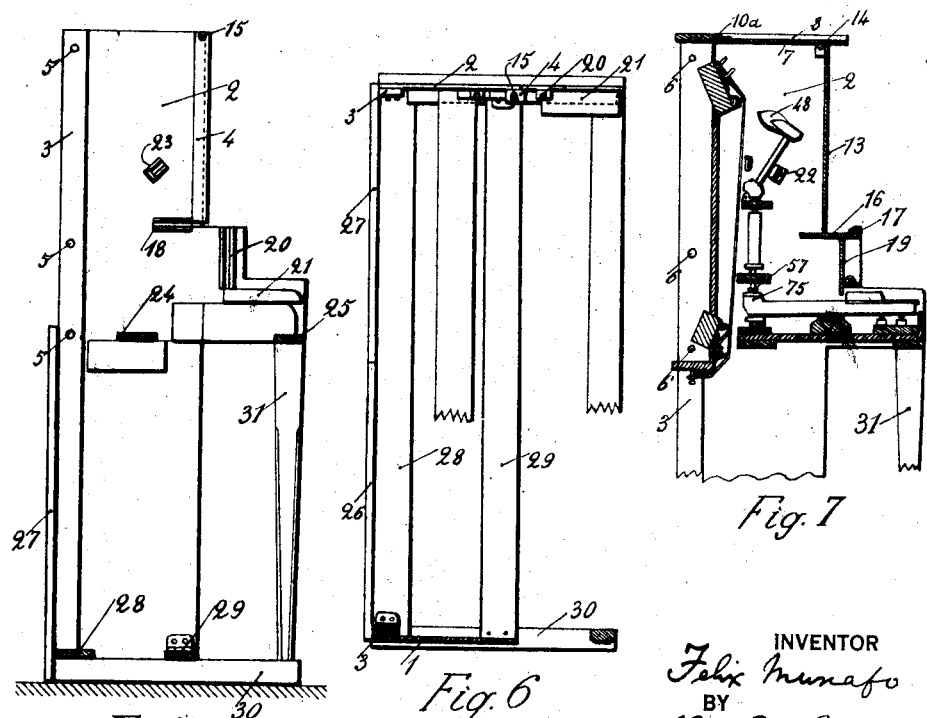
INVENTOR
Felix Munafo
BY
ATTORNEY April 15, 1924.

F. MUNAFO

MINIATURE PIANO

Filed July 13, 1922 5 Sheets-Sheet 3

1,490,678

INVENTOR
Felix Munafo
BY
ATTORNEY

April 15, 1924.

F. MUNAFO

MINIATURE PIANO

Filed July 13, 1922  5 Sheets-Sheet 4

1,490,678

INVENTOR
Felix Munafo
BY
W. J. Bising
ATTORNEY

April 15, 1924.
F. MUNAFO
MINIATURE PIANO
Filed July 13, 1922
1,490,678
5 Sheets-Sheet 5
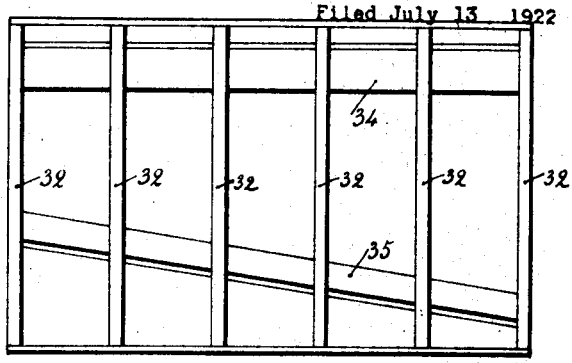
Fig. 13
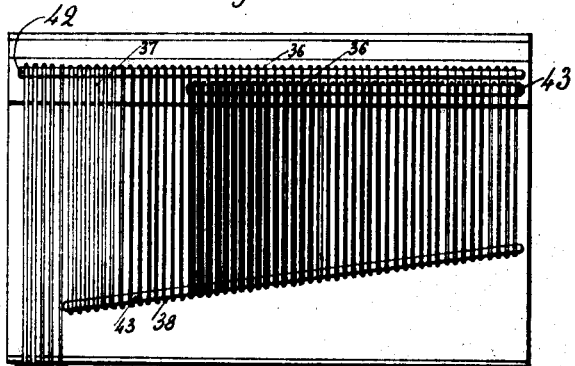
Fig. 14
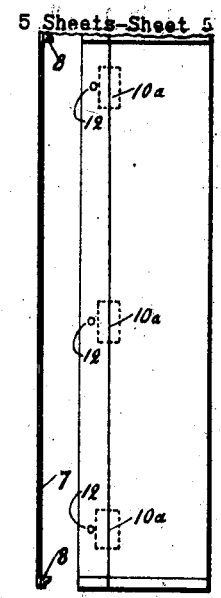
Fig. 16   Fig. 17
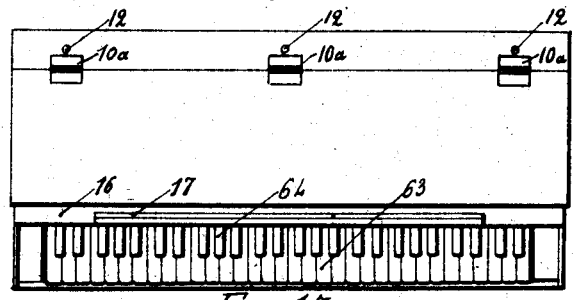
Fig. 15
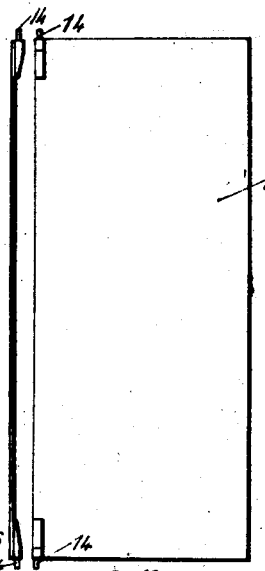
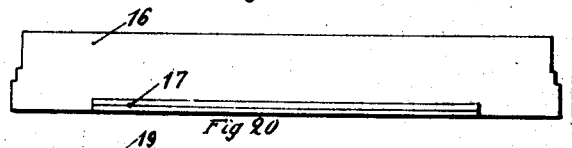
Fig. 20   Fig. 18   Fig. 19
          Fig. 21
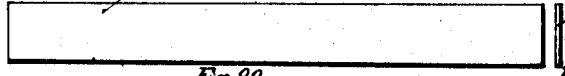
Fig. 22   Fig. 23
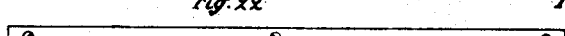
Fig. 24   Fig. 25
INVENTOR
Felix Munafo
BY
W. J. Dining
ATTORNEY Patented Apr. 15, 1924.

1,490,678

UNITED STATES PATENT OFFICE.

FELIX MUNAFO, OF BROOKLYN, NEW YORK.

MINIATURE PIANO.

Application filed July 13, 1922. Serial No. 574,603.

*To all whom it may concern:*

Be it known that I, FELIX MUNAFO, a citizen of the United States, residing at 407 97th Street, Brooklyn, New York city, New York, have invented certain new and useful Improvements in Miniature Pianos, of which the following is a specification.

My invention relates to pianos and more particularly to a miniature collapsible piano provided with a removable unit carrying the strings and action, another unit carrying keys of usual width, and a third unit comprising the collapsible frame, the piano while preserving a large volume of tone and the quality of its sound, is nevertheless portable, of light weight and of small size so that it may be readily carried by one man from place to place and may be easily taken apart, packed into three bundles, carried to its destination and re-assembled into a complete musical instrument which can be played both by adults and by children in the same manner as an ordinary piano.

One of the objects of my invention is to do away with the heavy back and metallic sounding board of the ordinary piano, another object being to make the frame of few parts which can be rapidly assembled, the action and the keyboard being quickly insertable and removable.

In accordance with the invention, the sounding board, the strings, the damper, the hammers and the actuating rods for the hammers are all mounted as a single unit which may be placed between the side frames so as to in itself form the back of one half of the rear of the piano.

The keys and the carrier upon which they are mounted, form another unit which can be slid into place, the width of the keys being full size and being mounted at the correct height for playing.

With the above and other objects in view, my invention consists in the parts, improvements and combinations more fully pointed out hereinafter.

Referring to the drawings:

Figure 1 illustrates an elevation of the inside of one of the side frames, partly broken away;

Figs. 1ª, 1ᵇ, 1ᶜ, 1ᵈ, 1ᵉ illustrate certain removable parts of the frame;

Fig. 2 is a side elevation showing the unit made up of the sounding board, strings, hammers and rods;

Fig. 3 is a side elevation of the keyboard and its carrier ready to be slid into place in the frame;

Fig. 4 is a front elevation of the frame with the action and keyboard removed;

Fig. 5 is a side elevation of the inside of one end of the frame;

Fig. 6 is a plan view looking down on Fig. 1 with certain members of the frame broken away;

Fig. 7 illustrates the upper portion of the frame with the keyboard and action in place, the parts being shown in vertical section;

Fig. 13 is a back view of the action unit illustrating the back of the sounding board;

Fig. 14 is a front view of the strings carried by the action;

Fig. 15 is a top view of the keyboard and its carrier;

Figs. 16 and 17 represent side views and plan views of the removable top for the frame;

Figs. 18 and 19 illustrate side views and plan views of the removable upper front part of the frame;

Figs. 20 and 21 are a plan and a side view of the cover plate or music rack extending across the backs of the keys;

Figs. 22 and 23 illustrate plan and side views of the removable board extending above the keys; and Figs. 24 and 25 illustrate plan and side views of the damper.

Figure 8:
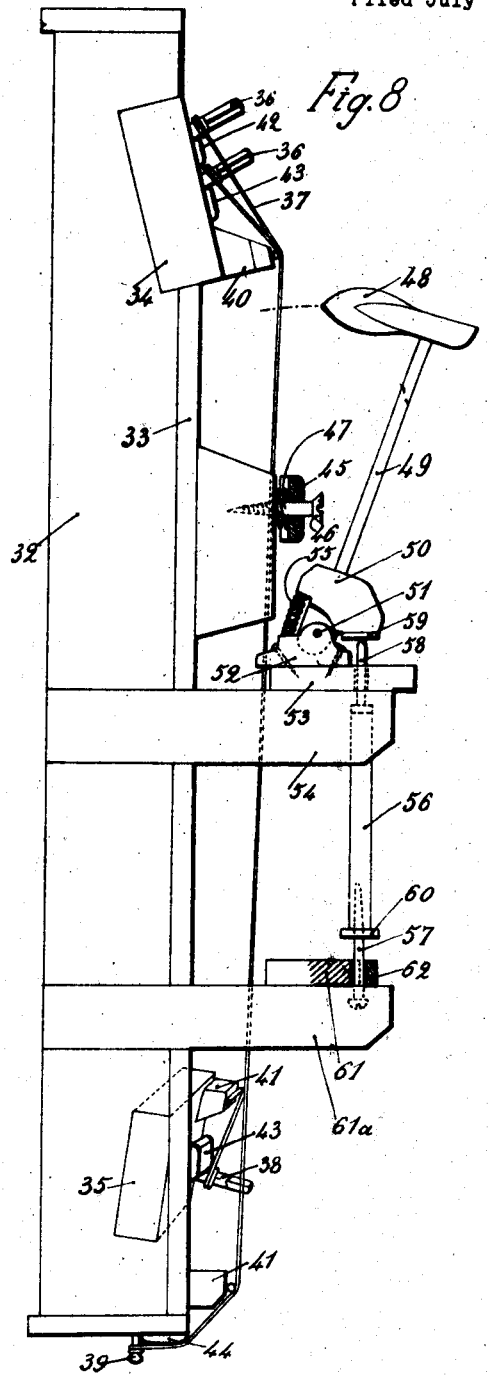
Fig. 8 is a side view.
Figure 9:
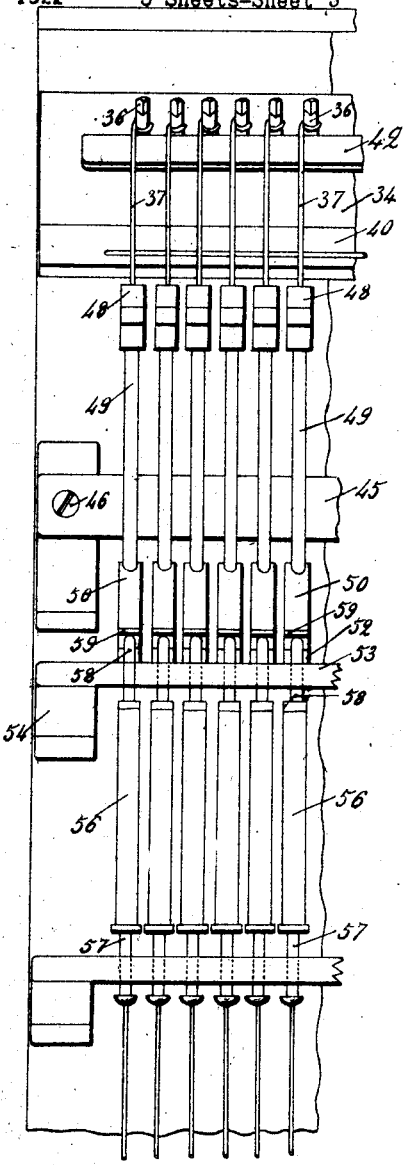
Fig. 9 is a front view of the unit forming the sounding board and action.
Figure 10:
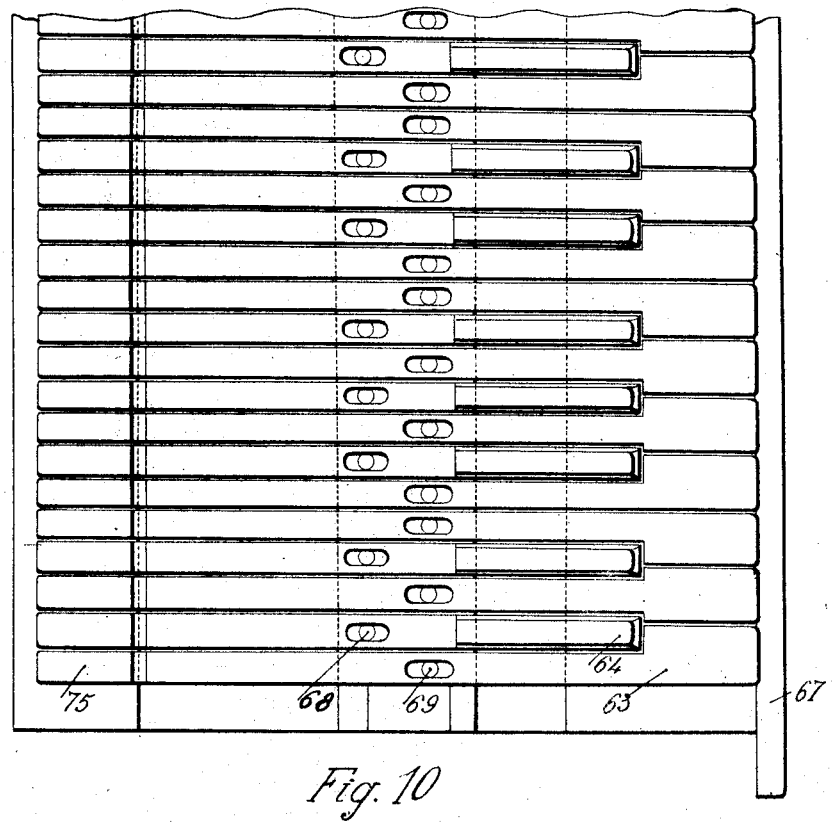
Fig. 10 is a top view and Fig. 11 a section of the keyboard.
Figure 11:
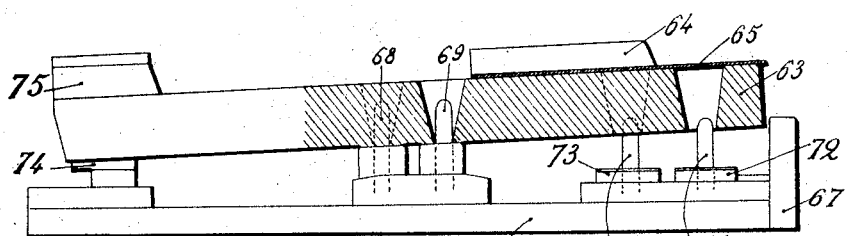

Referring again to the drawings:

The frame of the piano which can be taken apart and re-assembled, includes a pair of side walls 1, 2. At the back of each of the side walls there is secured an upright strip 3 and at the front a shorter vertical strip 4. Bolt holes 5 pass thru the back strip and side wall corresponding to bolt holes 6 in the unit carrying the action and sounding board so that the action including the sounding board may be removably bolted at the upper half of the side frame so as to form the back, as will be more fully explained hereinafter.

A removable top 7 with ledges 8 at each end, is provided (see Figs. 1, 13 and 14), the top being laid down flat upon the sides with the ledges 8 engaging the outside of the sides, the top thus serving to hold the upper portions of the sides together so as to strengthen the structure. The back 9 of the top is secured, as by screws, to the top portion 10 of the action unit after the latter has been bolted in place. By removing the screws 11, the top can be removed. The top is preferably provided with a hinged portion, hinged at 10ª, so that the front of the top may be raised to permit an increase in the volume of sound coming from the piano.

A front panel 13 is provided with a pair of pins 14, the said pins entering recesses 15 in the front strips 4. The front panel is dropped in place so as to rest between the side frames, being held by the pins.

A music rack 16 is provided in the form of a shelf with a ledge 17, the music rack forming a slide which can be slipped into ways 18 carried by the sides, thus helping as well to complete the casing. The ledge supports the edge of the standing sheet of music or book.

The front of the piano above the keyboard is closed by means of a removable cover panel 19 which is dropped in between slideways 20 carried by the side frames, the cover panel resting on ledges 21, there being one ledge for each side frame.

A removable hammer-rest rail 22 is provided which slips into supports 23 carried by the sides, the backs of the hammer stems resting against the rail when the hammers are at rest.

The side frames likewise carry ledges for the removable transverse bars 24, 25 which form supports for the sliding key carrier when the latter is in position.

At the lower back of the frame, removable cross pieces 26, 27 are provided serving as braces which may be attached by screws. At the bottom of the frame are provided a plurality of transverse members 28, 29 which are hinged at one end to their respective side frames, their free ends being secured to feet 30, the latter supporting the piano. Front legs 31 are provided for the projecting part of the piano case.

It will be observed that by detaching the free ends of the bottom transverse members and swinging them up on their hinges, and removing the cross members which tie the two side walls together, that the frame of the piano can be disassembled and stacked into a bundle.

In accordance with my invention and to simplify and lighten the construction without changing its character as a musical stringed instrument, which is operated by keys in the usual manner, I provide a removable member comprising sounding board, strings, hammers and rods mounted as a unit so as to be removable and replaceable in the frame. In the best embodiment of the invention, this unit forms the upper half of the back of the piano. The unitary member comprises joists 32 carrying a sounding board 33 on their faces, the joists being notched to receive cross bars 34, and 35, so as to firmly unite the elements forming the sounding mechanism. The upper cross bar 34 carries the tuning pins 36 to which one end of the strings 37 is connected, the lower cross bar being provided with one set of pins 38 to receive the corresponding ends of one set of the strings, another set of pins 39 being mounted at the end of the frame of the unitary member to receive the ends of the other set of strings.

The cross bars 34, 35 also carry bridges 40, 41 over which the strings pass so as to fix their vibrating length.

To preserve the tension, and consequently the tautness of the strings, metal bars 42, 43, 44 are provided in front of the pins to which the ends of the strings are connected. The parts described being rigidly braced and integrally mounted, the strings may be tuned and will preserve their tone when in use.

A damper or damping bar 45 carried by pins 46, is carried by the action member, a spring 47 pressing the bar away from the strings. Suitable connections (such as a flexible cord or wire) to a pedal (not shown) may be used for operating the damper.

The hammers 48 are likewise carried by the action unit. These hammers are provided with stems 49 which enter butts 50 pivoted at 51 in brackets 52 secured to a cross rail 53 carried by arms 54, said arms being mounted on the action unit. Springs 55 return the hammers. The hammers are actuated by means of a simplified actuating mechanism consisting of rods 56 provided at their key ends with adjusting screws 57 and at their hammer ends with pins 58 engaging the hammer butts 50. Felt-pieces 59, 60 respectively attached to the hammer butts 50 and stickers 56, avoid noise.

Figure 12:
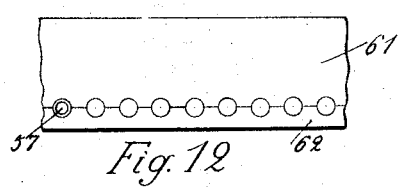
Fig. 12 is a plan view of the two-part cross piece for holding the ends of the rods in place.

The adjusting screws 57 pass thru a two-part rail 61 carried by the action unit, being supported by arms 61ª, the front 62 of the rail being removable as shown in Fig. 12 when it is desired to adjust any one rod 56.

Means are provided for removing and replacing the unit in the frame of the piano. As illustrated, the unit is placed in the upper half of the back of the frame, bolt holes 5 and 6 being in registering relation and bolts passing thru the holes to clamp the unit in place.

In accordance with the invention, a sliding carrier is provided for the keys, the keys and carrier forming a unit. As illustrated, the keys 63, 64, white and black, the white keys preferably having celluloid faces 65, are mounted on the slide 66, the front 67 of the slide filling the space in front of the key. In the particular form of the invention illustrated, two sets of pivots forming two rows, are used to mount the keys. One row of pivots 68 for the black keys is arranged back of the row of pivots 69 for the white keys. Pins 70, 71 guide the front of the keys and felts 72, 73, 74 secure quiet action. When the key unit is slid into place the slide 66 rests upon the transverse bars 24 and 25 which support it.

The felted abutments 75 carried by the backs of the keys then rest under the adjusting screws 57 so that on depressing a key the hammer is actuated.

Having thus described the invention, the operation will be clear. In order to take the piano apart, the top 7 is first removed, then the front panel 13, then the hammer rest 22, then music rest 16 and cover panel 19. The keyboard carrier can now be slid out.

After this the unit action is removed by removing the bolts from holes 5, 6, the action then being lifted out thru the top and front of the piano.

The frame is now collapsed by removing the transverse bars 24, 25, the bracing cross pieces 26, 27 and by unscrewing the free ends of the hinged transverse members 28, 29. Parts of the frame are then assembled in one bundle, the action with sounding board forming another, and the sliding key carrier a third package.

The parts are re-assembled in the inverse order.

It is understood that the invention is not limited to details and that numerous changes may be made in carrying it into effect without departing from the principle thereof.

Having described the invention, what I claim and desire to secure by Letters Patent is:

1. A miniature collapsible piano comprising in combination a frame, said frame including a pair of side walls, a removable and replaceable unit, said unit comprising a sounding board, strings extending over the board and secured thereto, a plurality of hammers carried by the said unit, a plurality of stickers carried by said unit for actuating said hammers, and a removable unit comprising a plurality of keys extending under said stickers for actuating said stickers, said frame, sounding board unit and key unit being operatively connected.

2. In a miniature collapsible piano the combination of a pair of side frames, cross pieces for connecting the lower parts of the side frames, a member comprising a sounding board, strings, hammers and stickers mounted as a unit so as to be removable and replaceable in the frame, the over-all length of said member being substantially less than the height of the frame, and means for detachably securing said member at the upper portion of the back of the side frames.

3. A miniature collapsible piano comprising in combination a pair of side frames, a member comprising sounding board, strings, hammers and stickers mounted as a unit so as to be removable and replaceable in the frame, the over-all length of said member being substantially less than the height of the frame, means for detachably securing said member at the upper portion of the back of the side frames, slide-ways carried by said side frames, a keyboard, a carrier for said keyboard, said carrier being adapted to be slid into said slideways so that the backs of the keys will lie under the hammer actuating stickers.

4. In a miniature collapsible piano the combination of a pair of side frames, cross pieces for bracing the lower parts of the side frames, a member comprising sounding board, strings, hammers and stickers mounted as a unit so as to be removable and replaceable in the frame, the over-all length of said member being equal to about one-half of the height of the frame and means for detachably securing said member at the upper half of the side frame so as to form a back.

5. A miniature collapsible piano comprising in combination a pair of side frames, transverse members hinged to said side frames, means for securing the free ends of said transverse members to their respective side frames, removable cross-pieces extending between said side frames, and forming supports for the keyboard, means for securing the sounding board and action to the upper half of the side frames, a top and a front panel for the frame, means carried by the side frames for receiving said front panel and means for securing said top to said sounding board.

6. A miniature collapsible piano comprising in combination a pair of side frames, transverse members hinged to said side frames, means for securing the free ends of said transverse members to their respective side frames, removable cross-pieces extending between said side frames, and forming supports for the keyboard, means for securing the sounding board and action to the side frames, a top and a front panel for the frame, means carried by the side frames for receiving said front panel, slideways carried by said side frames, a removable hammer-rest rail carried by said slideways, vertical and transverse slides carried by the side frame below the front panel, and removable cover plates carried by said vertical and transverse slides, the plate for the transverse slide forming a music rack.

7. A miniature collapsible piano comprising in combination a frame, said frame including a pair of side walls, a removable and replaceable unit, said unit comprising a sounding board, strings extending over the board and secured thereto, a plurality of hammers carried by the said unit, a plurality of stickers carried by said unit for actuating said hammers; a plurality of keys for actuating said stickers, a carrier for said keys, said keys and carrier forming a key unit and means carried by said side frames for removably supporting said key unit.

8. A miniature collapsible piano comprising in combination a frame, said frame including a pair of side walls, a removable and replaceable unit, said unit comprising a sounding board, strings extending over the board and secured thereto, a plurality of hammers carried by the said unit, a plurality of stickers carried by said unit for actuating said hammers, adjusting screws carried by the lower ends of said stickers; a plurality of keys for actuating said stickers, a carrier for said keys, said keys and carrier forming a key unit and means carried by said side frames for removably supporting said key unit.

9. A miniature collapsible piano comprising in combination a frame, said frame including a pair of side walls, a removable and replaceable unit, said unit comprising a sounding board, strings extending over the board and secured thereto, a plurality of hammers carried by the said unit, a plurality of stickers carried by said unit for actuating said hammers, adjusting screws carried by the lower ends of said stickers, a two-part rail carried by the action unit thru which said screws pass; a plurality of keys for actuating said stickers, a carrier for said keys, said keys and carrier forming a key unit and means carried by said side frames for removably supporting said key unit.

10. A miniature collapsible piano comprising in combination a frame, said frame including a pair of side walls, a removable and replaceable unit, said unit comprising a sounding board, strings extending over the board and secured thereto, a plurality of hammers carried by the said unit, a plurality of stickers carried by said unit for actuating said hammers, adjusting screws carried by the lower ends of said stickers, a two-part rail thru which said screws pass arms carried by said unit for supporting said rail; a plurality of keys for actuating said stickers, a carrier for said keys, said keys and carrier forming a key unit and means carried by said side frames for removably supporting said key unit.

11. A miniature collapsible piano comprising in combination a frame, said frame including a pair of side walls, a removable and replaceable unit comprising a sounding board, strings extending over the board and secured thereto, a pair of arms extending from said unit, a cross rail carried by said arms, a plurality of hammers mounted on said cross rail, a pair of arms secured to said unit beneath said first-named arms, a cross rail carried by the lower arms, straight hammer actuating stickers mounted to reciprocate in the upper and lower cross rails, said stickers adapted to contact with the hammer carriers when actuating them; a sliding key carrier, a plurality of keys carried thereby for actuating the stickers, the keys and carrier forming a key unit, and means carried by the side frames for removably supporting the key unit.

12. A miniature collapsible piano comprising in combination a frame, said frame including a pair of side walls, a removable and replaceable unit, said unit comprising a sounding board, strings extending over the board and secured thereto, a plurality of hammers carried by the said unit, a plurality of stickers carried by said unit for actuating said hammers, a plurality of black and white keys for actuating said stickers, a carrier for said keys, said keys and carrier forming a key unit, two sets of pivots for said keys mounted on said carrier thus forming two rows, the rows of pivots for the black keys being arranged back of the pivots for the white keys and means carried by said side frames for removably supporting said key unit.

13. A miniature collapsible piano comprising in combination, a pair of side walls, a removable and replaceable unit, said unit comprising a sounding board whose overall length is equal to about one-half of the height of the piano, strings extending over the board and secured thereto, a pair of arms mounted upon said unit, a cross rail carried by said arms, a plurality of pivoted hammers carried by said cross rail, a plurality of stickers carried by said unit for actuating said hammers, means for detachably securing said unit to the upper portion of the backs of the side walls, a plurality of keys for actuating said stickers, the backs of the keys lying beneath said stickers, a carrier for said keys, said keys and carrier forming a key unit, and means carried by the side walls for removably supporting said key unit.

14. A miniature collapsible piano comprising in combination a pair of side walls, a removeable and replaceable unit, whose overall length is equal to about one-half of the height of the piano, said unit comprising a sounding board, strings carried thereby, two pairs of arms mounted upon the side of the unit and extending therefrom, a cross rail connecting each pair of arms, a plurality of hammers pivotally mounted upon the upper cross rail, a plurality of stickers for actuating said hammers, said stickers extending between and guided by the two cross rails, a plurality of keys extending beneath said stickers for actuating them, a carrier for said keys, said keys and carrier forming a key unit, and means carried by said side walls for removably supporting said key unit.

In testimony whereof, I have signed my name to this specification.

FELIX MUNAFO.